United States Patent [19]

Richards

[11] Patent Number: 4,703,667

[45] Date of Patent: Nov. 3, 1987

[54] BLOCKED JAW CLUTCH ASSEMBLY

[75] Inventor: Elmer A. Richards, Kalamazoo, Mich.

[73] Assignee: Eaton Corporation, Cleveland, Ohio

[21] Appl. No.: 837,112

[22] Filed: Mar. 7, 1986

[51] Int. Cl.4 .............................................. F16H 3/38
[52] U.S. Cl. ........................................ 74/339; 74/331
[58] Field of Search ........................ 74/339, 331, 360

[56] References Cited

U.S. PATENT DOCUMENTS

| | | | |
|---|---|---|---|
| 3,799,002 | 3/1974 | Richards | 74/745 |
| 3,921,469 | 11/1975 | Richards | 74/339 |
| 3,924,484 | 12/1975 | Richards | 74/331 |
| 3,983,979 | 10/1976 | Richards | 192/53 F |
| 4,132,122 | 1/1979 | Richards | 74/339 |
| 4,141,440 | 2/1979 | Richards | 74/339 X |
| 4,176,736 | 12/1979 | Richards et al. | 74/339 X |
| 4,192,196 | 3/1980 | Bogema et al. | 74/339 |
| 4,194,410 | 3/1980 | Richards | 74/339 |
| 4,375,172 | 3/1983 | Richards et al. | 74/339 |
| 4,440,037 | 4/1984 | Foxton et al. | 74/331 |
| 4,527,447 | 7/1985 | Richards | 74/866 |

FOREIGN PATENT DOCUMENTS 3035852 2/1983 European Pat. Off. .

*Primary Examiner*—Leslie Braun
*Assistant Examiner*—Joseph M. Rolnicki
*Attorney, Agent, or Firm*—D. A. Rowe; H. D. Gordon

[57] ABSTRACT

A blocked jaw clutch assembly (156) of the type having sensor unblocking ramps (176, 178, 180, 182) is provided with structure tending to cause the blocking torque friction surface (188) carried by the blocker ring (124) to frictionally engage the blocking torque friction member (190) carried by the first jaw clutch member (108, 164, 188) with a circumferentially non-symetrical axial force.

9 Claims, 17 Drawing Figures

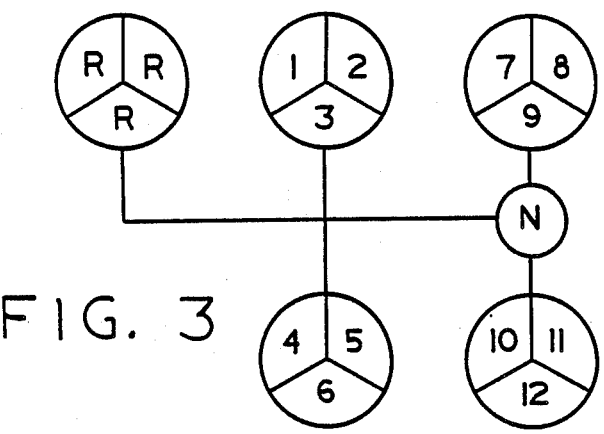
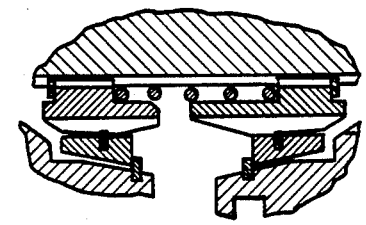
FIG. 3
FIG. 2A
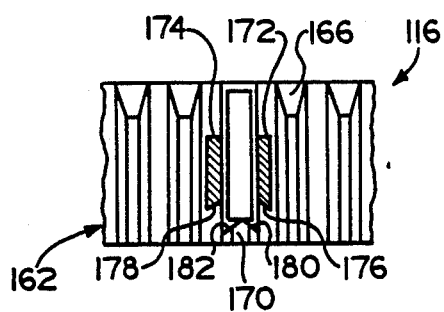
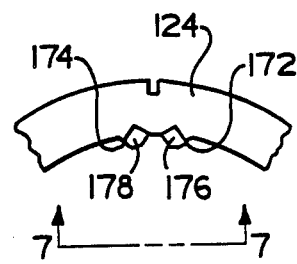
FIG. 5
FIG. 6
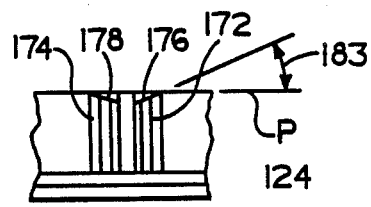
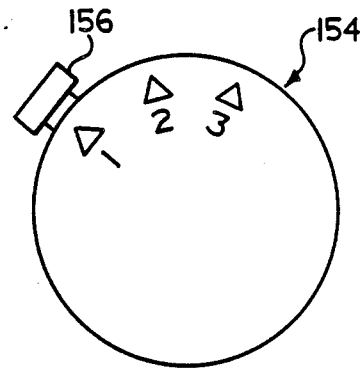
FIG. 7
FIG. 8

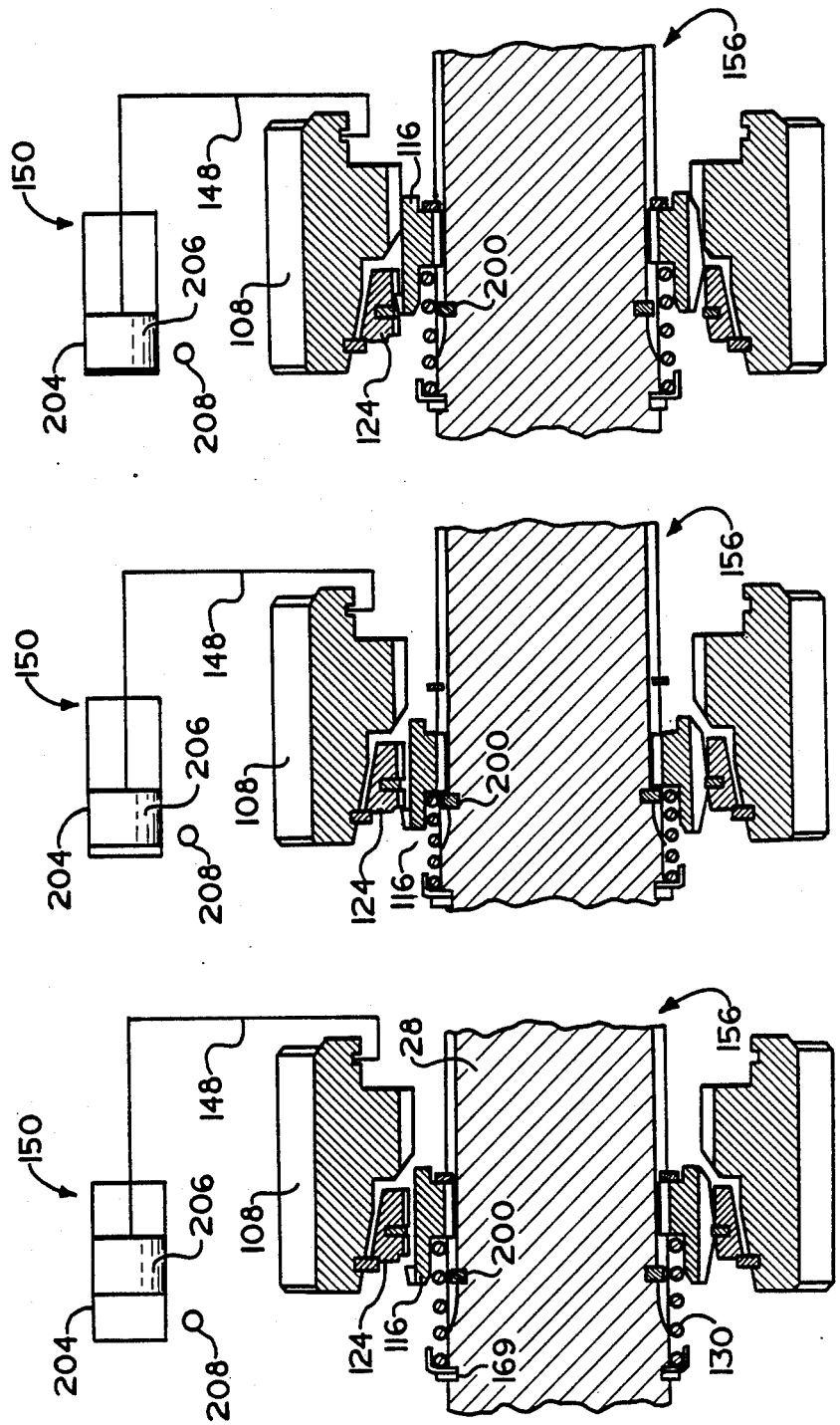

BLOCKED JAW CLUTCH ASSEMBLY

BACKGROUND OF THE INVENTION

1. Field of the Invention

This invention relates to blocked jaw clutch assemblies and to transmissions utilizing same and in particular to improved blocked jaw clutch assemblies for use in compound transmission wherein at least one transmission section utilizes blocked resiliently shifted jaw clutch assemblies wherein the blockers and associated clutch members in the auxiliary section have complementary ramps on the blocking members thereof configured to prevent nonsynchronized engagement of the associated jaw clutch members when the inertia on one of the clutch members exceeds a predetermined limit, such as when one of the other transmissions sections is engaged but which will tend to act as positioners to place the blocker and clutch member in a nonblocking condition when the inertia on the one clutch member is relatively low, such as when one or more of the other sections are in a neutral or disengaged condition.

2. Description of the Prior Art

Compound transmissions of the splitter or range type, or a combination thereof, are well known in the prior art as may be seen by reference to U.S. Pat. Nos. 3,105,395; 3,648,546; 3,799,002; 2,932,988 and 3,229,551, the disclosures of which are all hereby incorporated by reference.

Blocked change gear transmissions of both the single and the compound types are also well known in the prior art as may be seen by reference to U.S. Pat. Nos. 3,799,002; 3,921,469; 3,924,484; 3,983,979; 4,132,122; 4,192,196 and 4,194,410, the disclosures of which are all hereby incorporated by reference.

Semi-blocked compound change gear transmissions wherein the main section utilizes manually engaged nonsynchronized, unblocked jaw clutches to selectively engage a selected main section ratio gear and wherein the auxiliary section utilizes blocked resiliently shifted jaw clutches to selectively engage a selected auxiliary ratio, and wherein the blockers (also called sensors) and associated clutch members in the auxiliary section have complementary ramps (also called "sensor unblocked ramps") on the blocking members thereof configured to prevent nonsynchronized engagement of the associated jaw clutch members when the main section is engaged but which will tend to act as positioners to place the blocker and clutch member in a nonblocking condition when the main section is in a neutral or disengaged condition are known in the prior art as may be seen by reference to U.S. Pat. No. 4,440,037 and European Publication No. 0 071 353, published Feb. 9, 1983, of allowed European Patent Application No. 82 303 585.2 (corresponding to applicant's assignee's U.S. patent application Ser. No. 287,470, filed July 27, 1981), the disclosures of which are hereby incorporated by reference.

Automated and/or semi-automated blocked or semi-blocked change gear transmissions are known in the prior art as may be seen by reference to U.S. Pat. No. 4,527,447, the disclosure of which is hereby incorporated by reference.

The prior art semi-blocked compound transmissions, especially the splitter type, wherein the main transmission section is provided with well known nonsynchronized, unblocked jaw clutch assemblies, and the auxiliary transmission section is provided with resiliently shiftable blocked jaw clutch assemblies and, preferably, the blocked jaw clutch assemblies are provided with complimentary ramp members on the associated blocker and clutch members which will cause the blockers to prevent nonsynchronous engagement of the associated jaw clutch assemblies when the main transmission section is engaged but will allow the blocker to tend to rotationally move to a nonblocking position under the influence of a spring bias, when the main transmission section is in neutral, provides a relatively uncomplicated and reliable compound transmission which is shiftable with substantially the ease of a simple transmission and allows shifts to be completed with the vehicle in a static condition.

The blocked jaw clutch assemblies utilized in such transmissions are required to perform two distinct tasks, namely maintain a blocked condition under certain non-synchronous and relatively high inertia conditions and to unblock, by causing a synchronous condition to occur, regardless of the initial relative rotational speeds of the clutch members, under certain relatively low inertia conditions. Under certain adverse conditions, the ramped, blocked jaw clutch assemblies of prior art tended to unblock at improper conditions resulting in the blockers ceasing to prevent a nonsynchronous or crash type jaw clutch engagement, which is undesirable.

SUMMARY OF THE INVENTION

In accordance with the present invention, the drawbacks of the prior art have been overcome or minimized by the provision of an improved blocked clutch assembly utilizing sensor unblocking ramps wherein the tendency of the blockers or sensors to move to an unblocking condition under improper (i.e. non-synchronous relatively high inertia) conditions is minimized or eliminated while retaining the ability of the ramps to cause the blockers to move to an unblocked condition under proper (i.e. relatively low inertia) conditions.

The above is accomplished in one embodiment of the present invention by providing a plurality of arrays of blocking projections or teeth configured such that, at initial engagement of the blocker and clutch member, the resulting axial forces exerted between the blocker and contacted jaw clutch member are circumferentially non-symmetrical about the axes of rotation thereof sufficient to cause an initial relative tilting between the blocker and jaw clutch and/or relative radial displacement of the blocker ring and clutch members and/or localized contact between the blocking torque friction surfaces.

The above may be accomplished by a multitude of structural modifications. By way of example, the arrays may be spaced circumferentially non-symmetrical about the axis of the blocker and/or clutch, or the pre-energizer ring may be non-symmetrically mounted in the blocker ring; or a non-symmetrical pre-energizer ring may be utilized and/or the blocking projections at one or more arrays may be axially offset and/or eliminated.

The above improved structure has proven very satisfactory in tests and is believed to prevent improper unblocking because the nonsymmetrical contact of the blocking torque friction surfaces and/or relative tilting and/or radial displacement of the members results in an initial breakdown of the oil film on the blocking torque friction surfaces and thus, by creating a non-hydrodynamic bearing surface, allows an early establishment of blocking torque. Also, a relatively small friction force in a radial direction between the members, caused by the unbalanced radial components of the non-symmetrical forces acting on cone friction surfaces, may act in opposition to any premature unblocking force generated by the unblocking ramps. Briefly the invention is believed to provide the observed advantages by assuring that the blocking torque caused by the frictional engagement of cone surfaces on the blocker and first clutch member, which torque causes the blocker to tend to rotate with the first clutch member and thus properly clock relative to the second clutch member, is established at or prior to the time the ramp surfaces are urged into contact at initiation of a clutch engaging operation.

Accordingly, it is an object of the present invention to provide an improved blocked jaw clutch assembly of the type utilizing sensor unblocking ramps.

This and other objects and advantages of the present invention will become apparent from a reading of the detailed description of the preferred embodiment taken in view of the accompanying drawings.

DESCRIPTION OF THE DRAWINGS

FIG. 3 is a schematic illustration of the shift pattern of the transmission of FIG. 1

FIG. 5 shows the components of the blocker and jaw clutch fragmentarily in synchronous condition permitting shifting.

FIG. 6 is a fragmentary view of the blocker of FIG. 4.

FIG. 7 is a view taken in the direction of the arrows 7—7 in FIG. 6.

FIG. 8 is a top view of the shift lever knob and master control of the transmission of FIG. 1.

FIGS. 9A, 9B and 9C, respectively, illustrate the blocked jaw clutch assembly of the present invention in the neutral, preselect and gear engagement positions thereof.

DESCRIPTION OF THE PREFERRED EMBODIMENT

Referring now to the apparatus in detail, it will be recognized that a detailed disclosure of both the construction and operation of blockers and blocked or semi-transmissions utilizing same has been set forth and claimed in the above mentioned patents and reference is therefore made thereto for such details.

Figure 1:
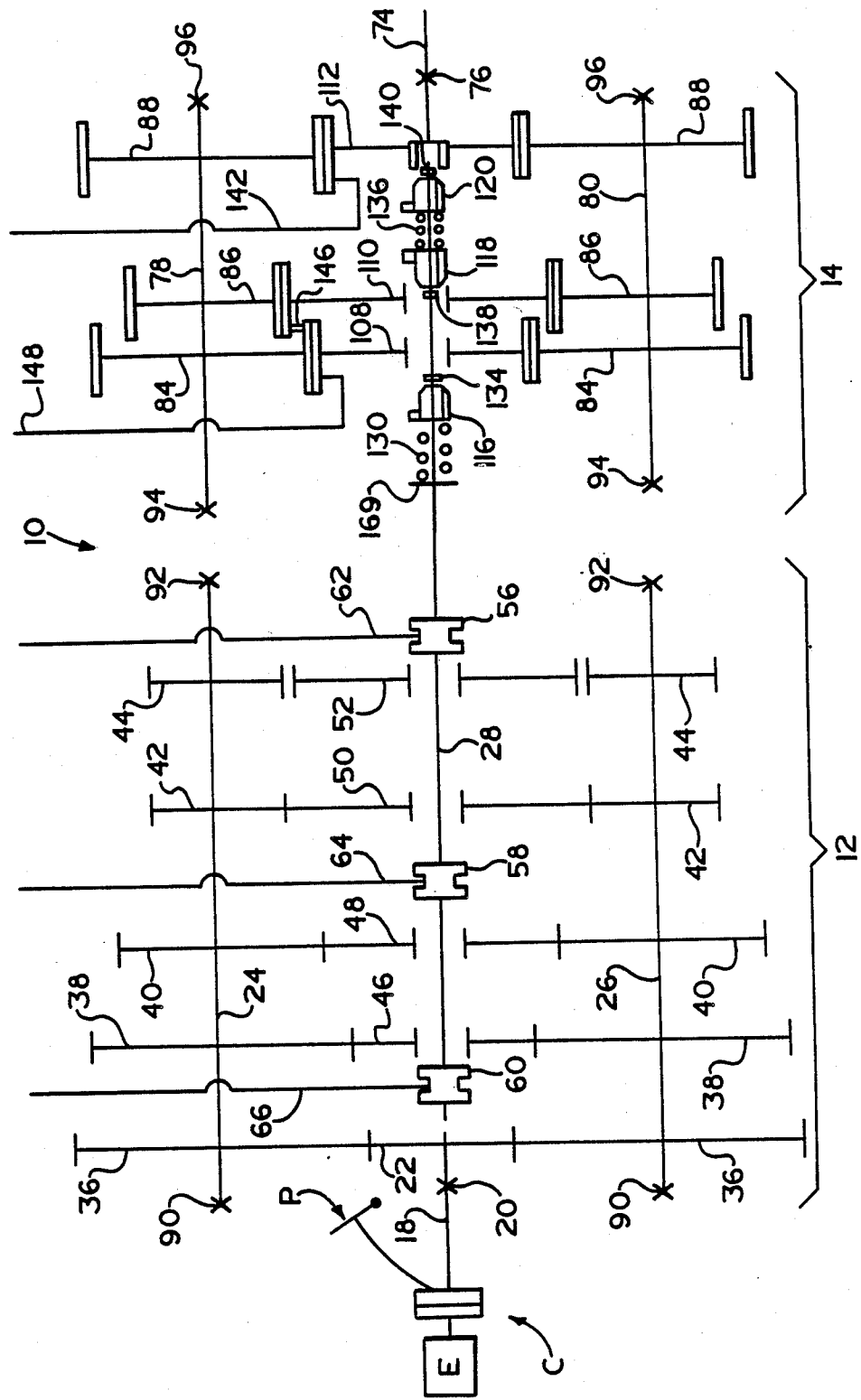
FIG. 1 is a schematic illustration of a "4×3" twelve speed version of semi-blocked transmission with which the improved blocked jaw clutch assembly of the present invention is advantageously utilized.

Certain terminology will be used in the following description for convenience in reference only and will not be limiting. The words "upwardly", "downwardly", "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof and words of similar import.

The term "compound transmission" is used to designate a transmission having a main transmission portion and an auxiliary transmission portion connected in series whereby the selected gear reduction in the main transmission portion may be compounded by further selected gear reduction in the auxiliary transmission port. The term "splitter type compound transmission" as used herein will designate a compound transmission wherein the auxiliary transmission is used to provide various selectable steps or subdivisions of the gear ratio selected in the main transmission port. In a splitter type compound transmission, the main transmission section is typically provided with relatively wide steps which are split or subdivided by the auxiliary section. The term "upshift" as used herein shall mean the shifting from a lower speed gear ratio to a higher speed gear ratio. The term "downwardly" as used herein shall mean the shifting from a higher speed gear ratio to a lower speed gear ratio. The terms "low speed gear", "low gear" and/or "first gear" as used herein shall all designate the gear ratio.

The term "blocked transmission" or "blocked transmission section" shall designate a change gear transmission or transmission section wherein a selected gear is nonrotatably coupled to a shaft by means of a positive clutch and a blocker is utilized to prevent such engagement until the members of the positive clutch are substantially synchronous, such synchronous condition achieved by manual and/or automatic manipulation of the transmission input and/or output shafts to cause a crossing of syncronous condition therebetween but not achieved by frictional contact of the selected clutch members sufficient to cause one of the clutch members, and the apparatus associated therewith, to rotate with the other clutch member.

The term "synchronized transmission" shall designate a change gear transmission wherein a selected gear is non-rotatably coupled to a shaft by means of a positive clutch, attempted engagement of said clutch is prevented until the members of the clutch are synchronous and frictional means associated with the clutch members are sufficient, upon initiation of a clutch engagement, to cause the clutch members, and all members rotating therewith, to rotate at a substantially synchronous speed of rotation.

Figure 2:
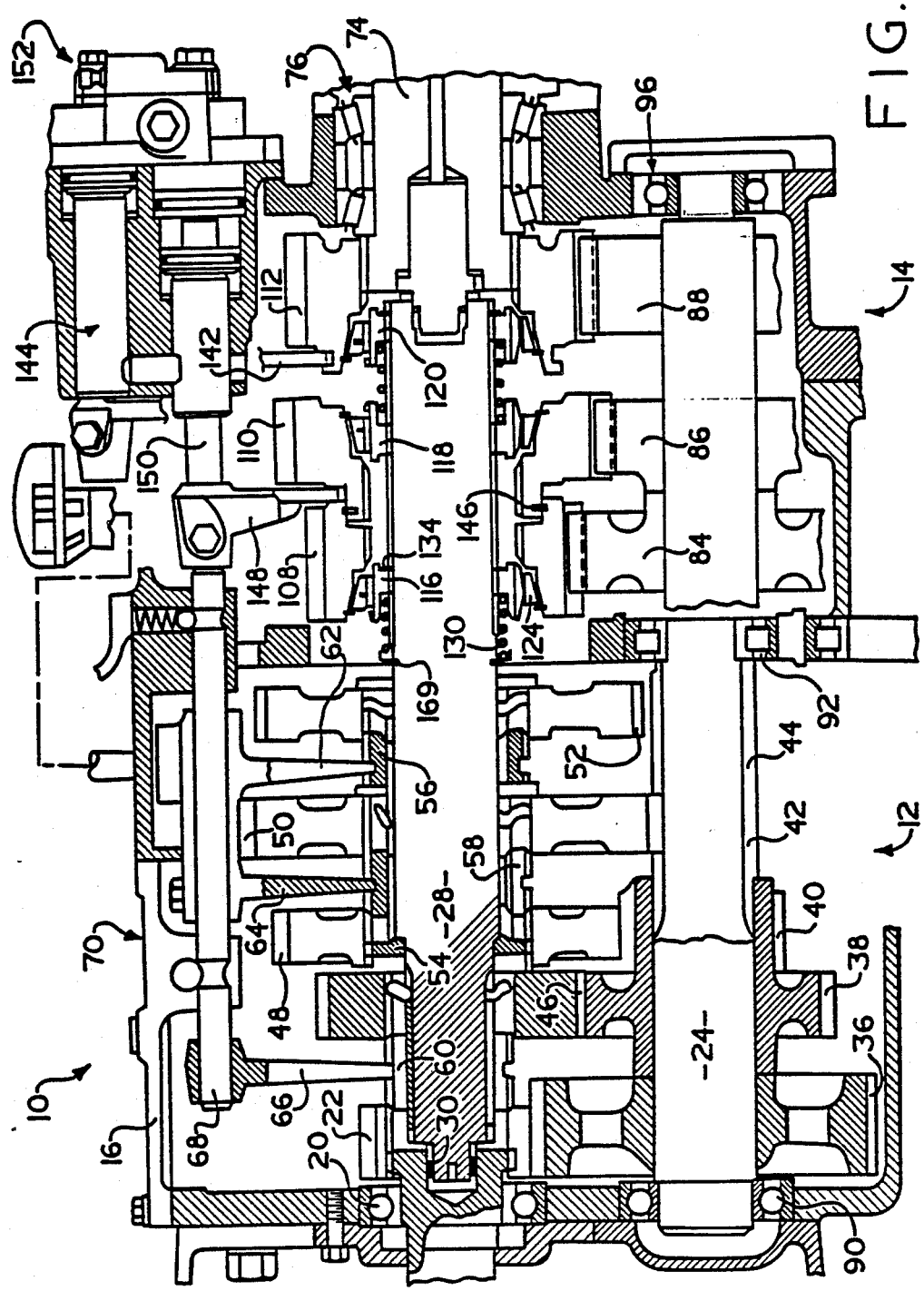
FIG. 2 is partial sectional view of the transmission on FIG. 1.

Referring now to FIGS. 1-3, there is illustrated a "4×3" twelve forward speed, semi-blocked, splitter type compound transmission 10. Transmission 10 comprises a main section 12 connected in series with an auxiliary section 14, each of which have a plurality of selectable speeds, or power paths. The main and auxiliary sections are both suitably enclosed by conventional housing means 16. While the blocked jaw clutch assemblies with sensor unblocking ramps of the present invention are especially well suited for use in connection with semi-blocked transmissions such as illustrated transmission 10, the assemblies are also advantageously utilized with other types of compound transmissions.

The transmission 10 includes an input shaft 18 supported adjacent its rearward end by a bearing 20 and is provided with an input gear 22 nonrotatably connected thereto, as by splines. The input gear 22 simultaneously drives a plurality of main section countershafts at equal speeds. In the illustrated embodiment, the transmission is provided with two main section countershafts, 24 and 26, disposed on diametrically opposite sides of the mainshaft 28, which mainshaft is coaxially aligned with the input shaft 18 and is provided with a pilot portion 30 on its forward end rotatably received within and supported by the rearward end of the input shaft 18.

The input shaft 18 is normally driven in one direction only by a primemover, such as a throttle controlled Diesel engine E through a selectively operated, normally engaged, friction master clutch C. Clutch C may be selectively disengaged by use of pedal P as is known in the prior art. Clutch C may have a known clutch-brake associated therewith.

Each of the main section countershafts 24 and 26 is provided with an identical grouping of countershaft gears, such as the pair of gears 36, of identical size and number of teeth and disposed on diametrically opposite sides of the mainshaft 28. As may be seen by reference to FIG. 2, countershaft gears 42 and 44 may be defined by involute splines formed directly on the main section countershafts.

A plurality of main section mainshaft drive gears 46, 48, 50 and 52 surround the mainshaft 28 and are selectably clutchable thereto, one at a time, by sliding clutch collars as is well known in the art.

The main section mainshaft gears 46, 48 and 50 encircle the mainshaft 28, are in continuous meshing engagement with, and are floatingly supported by the diametrically opposite pairs of countershaft gears, 38, 40 and 42, respectively, which mounting means and the special advantages resulting therefrom are explained in greater detail in U.S. Pat. Nos. 3,105,395 and 3,335,616, the disclosures of which are hereby incorporated by reference. The mainshaft gear 52 is the reverse gear and is in continuous meshing engagement with a pair of countershaft gears 44 by means of conventional intermediate idler gears (not shown). The forwardmost countershaft gears 36 are continually meshed with and driven by the input gear 22 for causing simultaneous rotation of the countershafts 24 and 26 whenever the input shaft is rotatably driven.

Main section mainshaft gears 46, 48, 50 and 52; and main section countershaft gears 36, 38, 40, 42 and 44, and the idler gears, are all constantly meshed with and driven by the input gear 22 and thus, in combination, form the input gearing of the transmission 10.

As may be seen, various abutment rings 54 are provided to axially fix the main section mainshaft gears relative to mainshaft 28.

Sliding clutch collars 56, 58 and 60 are splined to mainshaft 28 for axial movement relative thereto and rotation therewith as is well known in the art.

Sliding clutch 56 is axially slidable by means of shift fork 62 to clutch gear 52 to the mainshaft. Sliding clutch 58 is axially slidable by means of shift fork 64 to clutch either gear 50 or 48 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62, 64 and 66 are attached to shift bars or rails, (only one, 68, of which is shown) of a known shift bar housing assembly 70 which is operated by a conventional shift lever 72. The present invention is also applicable to transmissions utilizing a remote mechanical, electrical or fluid shift mechanism in place of shift bar housing 70 and shift lever 72 and also to fully or semi-automatic transmissions and transmission systems such is that illustrated in U.S. Pat. No. 4,361,060. the disclosure of which is hereby incorporated by reference.

Considering now the splitter auxiliary section 14, the mainshaft 28 extends thereinto and is coaxially arranged with and piloted into an output shaft 74 which is in turn supported within the housing 16 by suitable bearings generally indicated at 76. Said auxiliary section further includes a plurality of auxiliary section countershafts 78 and 80 each having an identical grouping of countershaft gears 84, 86 and 88 therein.

As is known in the art and is illustrated in above-mentioned U.S. Pat. No. 3,105,395, to minimize the axial and transverse dimensions of a twin countershaft type compound transmission, the mainshaft section countershafts, 24 and 26, are displaced about 90° from the auxiliary section countershafts. Main section countershafts are supported in housing 16 by bearings 90 and 92 while auxiliary section countershafts, 78 and 80, are supported in housing 16 by bearings 94 and 96.

Two auxiliary section mainshaft gears, 108 and 110, encircle the mainshaft 28 and are constantly meshed with and floatingly supported by the auxiliary countershaft gear pairs 84 and 86, respectively. Output gear 112 is splined to output shaft 74 for axial movement relative thereto and rotational movement therewith. Output gear 112 is constantly meshed with auxiliary countershaft gear pair 88.

Resiliently biased clutch members 116, 118 and 120 are splined to mainshaft 28 and, in combination with blockers (shown in FIG. 2) 124, 126 and 128, respectively, provide resilient, blocked clutching apparatus of the type described in above mentioned U.S. Pat. Nos. 3,799,002, 3,921,469 and 3,924,484 for selectively clutching gears 108, 110 and 112, respectively, one at a time, to mainshaft 28. Clutch 116 is biased axially by spring 130 and limited in its axial movement by positive stop 134. Clutch members 118 and 120 are biased axially apart by spring 136 surrounding the mainshaft and limited in axial movement by stops 138 and 140.

Gear 112 is axially moved by shift fork 142 which is movable by shift cylinder assembly 144. Mainshaft gears 108 and 110 are joined for joint axial movement and independent rotation by ring 146 and are axially movable by shift fork 148 movable by shift cylinder assembly 150. Shift cylinder assemblies 144 and 150 define a remote servo mechanism 152 by which gears 108, 110 or 112 are selectively engaged, one at a time, to mainshaft 28. Of course, engagement of gear 112 to the mainshaft 28 is effective to couple mainshaft 28 direclty to the output shaft 74.

Control of servo mechanism 152 is preferably, by a master control means, such as selector knob 154 (see FIG. 8) attached to the gear shift lever 72. typically, master control selector knob 154 will include a movable member, such as button 156, or toggle lever, having three unique positions ("1", "2" and "3") by which one of the auxiliary section power paths, or speeds, may be selected. Typically, the auxiliary section master control 154, and the servo mechanism 152, is fluid and/or electrically operated and suitable master-slave valving and/or circuitry is provided.

The details of the blocked, resiliently biased clutch-blocker assembly of the present invention may be seen by reference to FIGS. 4-7.

The yieldable blocked jaw clutch structures are arranged between the shiftable mainshaft gears and the auxiliary section and are provided with resilient means for urging engagement thereof as set forth in detail in the above mentioned U.S. Pat. No. 3,799,002; 3,924,484 and 3,983,979. While clutch means utilizing relatively nondeformable blockers of the prior art are not identical with each other, they are generally similar and hence insofar as the present invention is concerned, it will be sufficient to desribed only one of them in detail with the understanding that same may be applied to the other clutch units without difficulty by anyone skilled in the art. Therefore, for this purpose, referring to the positive jaw clutch unit positioned between the mainshaft gear 108 and the mainshaft 28 in the auxiliary transmission seciton 14, said jaw clutch unit is generally designated 156 and includes an annular clutch collar or clutch member 116 encircling the mainshaft 28. Other means for mounting clutch collar 116 to mainshaft 28 allowing relative axial but not rotational motion therebetween may be utilized. The clutch collar 116 is provided with internal splines 158 which are disposed within corresponding external splines 160 provided on the mainshaft 28 for interconnecting the clutch collar 116 to the mainshaft 28 for rotation therebetween. However, the cooperating splines 158 and 160 permit the clutch collar 116 to freely slide axially relative to the shaft 28. A stop ring 134 is seated within a suitable groove formed on the external periphery of the shaft 28 and is disposed for contacting the clutch collar 116 and limiting the rightward axial movement thereof. The collar 116 is normally resiliently urged by means of a spring 130 into a butting engagement with the stop ring 134.

The clutch collar 116 is provided with external teeth 162 thereon which are adapted to meshingly engage the internal teeth 164 provided on the mainshaft gear 108. The internal teeth 164 form the other jaw clutch member of clutch assembly 156. The teeth 162 on the clutch collar 116 are tapered, as at 166 and in a similar manner the leading edge of the teeth 164 on the mainshaft gear 108 are similarly tapered at 168. The tapered conical surfaces each extend at an angle of preferably between 30° and 40° relative to the longitudinal axis of the mainshaft 28. The exact degree of taper, and the advantages, thereof, are explained in detail in U.S. Pat. No. 3,265,173. The other end of the spring 130 resiliently acts against a spring seat member 169 fixed to mainshaft 28.

A selected number, here three, of the teeth 162 are partially removed for permitting the presence of a blocking ring as hereinafter further described. Such partial removal leaves, however, an axially shortened or partially removed tooth 170 for cooperation with the blocking ring.

Referring now to the relatively nondeformable blockers; also called blocker rings, blocking rings and sensors; which are illustrated in FIGS. 6 and 7, one thereof is indicated generally at 124, and comprises a ring encircling the clutch member 116 and has an appropriate number, here three pairs, of radially inward projections 172 and 174, which when properly positioned will mate with the external teeth above mentioned. The inward projections or teeth 172 and 174 are contoured at their sides to lie snugly against the adjacent ones of the teeth 162, are positioned to project into the spaces between a partially removed tooth 170 and the teeth 162 on each side thereof. Each pair of projections 172 and 174 are circumferentially of less dimension than the corresponding circumferential spaces defined by partially removing teeth 170 and thus blocker ring 124 may be rotated in either a limited clockwise or counterclockwise direction relative to clutch member 116 from the position seen in FIG. 5 in which the space between teeth 172 and 174 aligns with partially removed tooth 170. Contact of either blocker tooth 172 or 174 by a clutch tooth 162 will limit such relative rotation and cause blocker 124 to rotate with clutch member 116. The space between the inwardly projecting teeth 172 and 174 is, however, of a clearance distance wider than the corresponding circumferential dimension of the tooth 170 so that when properly aligned at synchronism (or more accurately, when the relative speeds of the clutch components cross synchronism) the teeth 172 and 174 will straddle the tooth 170 and the clutch member 116 can move axially through but not past blocker ring 124 to effect engagement with its corresponding gear.

As may be seen by reference to FIGS. 6 & 7, the end faces of the blocker teeth 172 and 172 are tapered as at 176 and 178. The end face of partially removed tooth 70 is also preferably provided with tapers to ramps 180 and 182 complementary with the tapers or ramps 176 and 178 on the blocker ring blocking teeth 172 and 174. The angles 183 of the ramps 176, 178, 180 and 182 is selected such that the blocking teeth and the partially removed teeth will remain in proper blocked position when the main transmission section 12 is engaged but will tend, under a contacting force, such as spring 130 and/or actuator 150, if an auxiliary section shift has been selected, to cause the blocker and clutch to assume a nonblocking position (by causing relative rotational movement of the clutch 116, blocker 124 and/or mainshaft 28) if the main transmission section is disengaged, i.e. in neutral. A ramp angle 183 of about 15°-25°, preferably about 20°, relative to a plane P normal to the axis of rotation of the mainshaft 28 has proven highly satisfactory for most known semi-blocked transmission structures.

As is described in greater detail by reference to above mentioned U.S. Pat. Nos. 3,921,469 and 3,924,484, the radially inner side of ring 124 may be provided with an inwardly directed groove 184 which receives an annual resilient ring 186 which is normally of slightly less internal diameter than the external diameter of the teeth 162 so that when the parts are in the assembled condition, ring 186 is distorted slightly outwardly thereby to exert a light but definite pressure against the external surface of said teeth 162. Inasmuch as the ring 186 fits loosely and only in light frictional contact with the walls of the groove 184, this effects a significant resistance to axial movement between the blocker ring 124 and the clutch ring 116 but only an insignificant resistance to relative rotative movement therebetween.

A suitable conical surface 188 projects radially outwardly from the blocker ring 124 and is positioned for engagement with a similar conical surface 190 on a radially inner wall of the gear 108. The axial drag above mentioned is sufficient that the rotative driving effect of the surface 190 onto the blocker 124 is much greater than whatever rotative resistance may exist between the blocker 124 and the clutch member 116. Surfaces 188 and 190 thus provide the blocking torque for the blocked jaw clutch assembly. A stop ring 192 limits movement of the blocker 124 away from the conical surface 190 when the clutch ring 116 moves out of engagement (leftwardly in FIG. 4).

Referring to FIGS. 5–7, assuming that shaft 28, clutch member 116 and gear 108 are normally driven in the clockwise direction, it is apparent that the nonsynchronous condition comprising gear 108 rotating faster than shaft 28 and clutch 116 is sensed by engagement of tooth 170 with projection 174 while the opposite condition is sensed by engagement of tooth 170 with projection 172. Accordingly, projection 174 may be considered the overspeed or upshift projection while projection 172 may be considered the underspeed or downshift projection of the projection pair 172–174.

Figure 4:
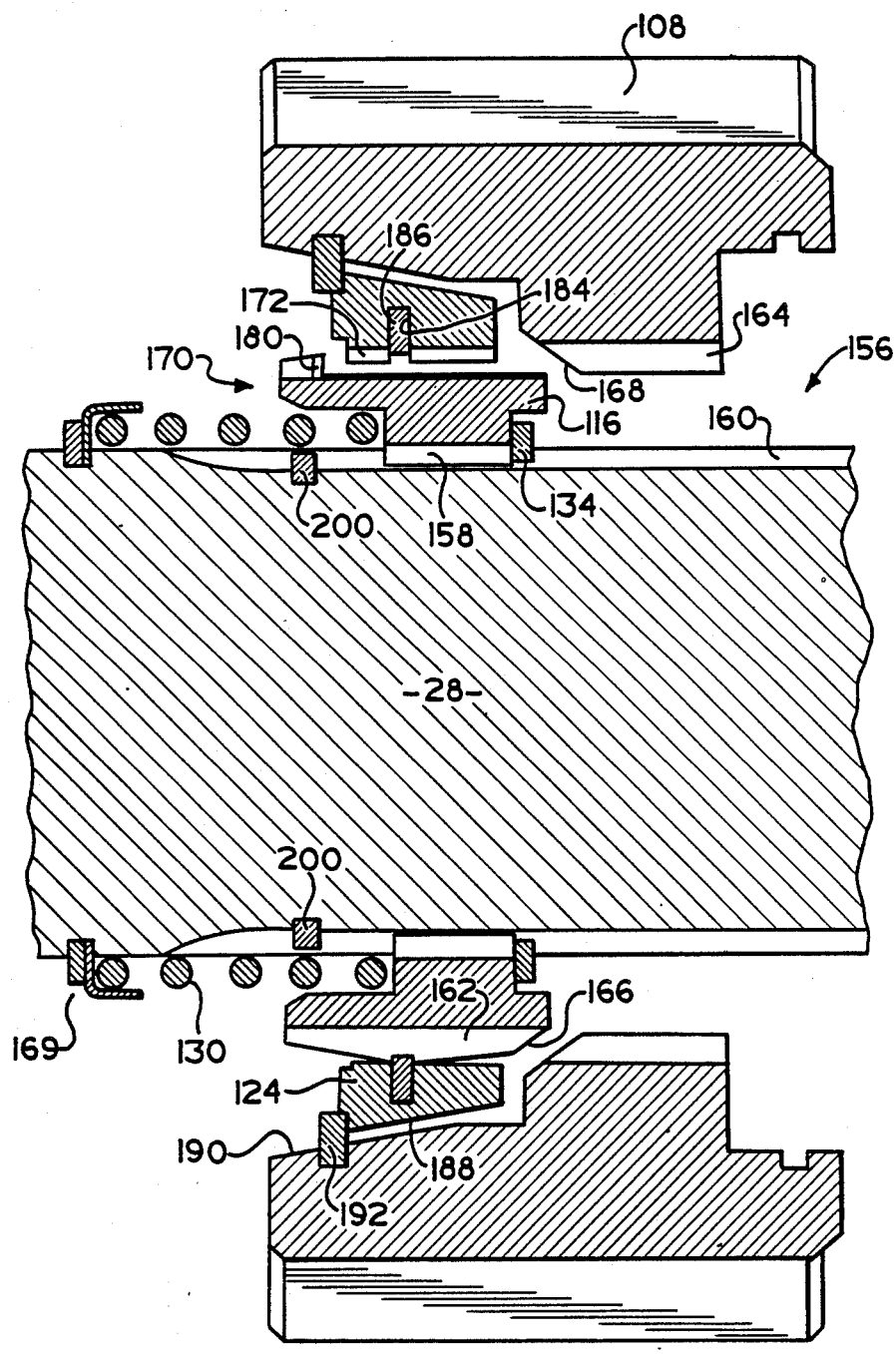
FIG. 4 is an enlarged fragmentary view, in section of one of the jaw clutch-blocker assemblies utilized in the auxiliary splitter section of the transmissions of FIG. 1.

The improved blocked jaw clutch assembly of the present invention may include a positive means to limit axial movement of clutch member 116 away from stop member 134. In FIG. 4, the additional stop means illustrated is ring 200. Other means to limit axial movement of the clutch members 116, 118 or 120 may, of course, be utilized. The stop means is positioned such that, when the blocking arrays 170, 172 and 174 are in the blocking or non-aligned position, axial movement of clutch 116, and gear 108 which is axially fixed thereto under such conditions, will be limited or stopped at less than the full leftwardly displaced position of the actuator 150.

The operation and special advantages of the blocked clutched assembly of the present invention may be seen by reference to FIGS. 9A - 9C which illustrate the structure and operational function thereof.

Briefly, FIG. 9A illustrates the neutral position, FIG. 9B illustrates the preselect position and FIG. 9C illustrates the gear engaged position, of clutch assembly 156.

Gear 108 is axially moved leftwardly against the bias of spring 130 by shift fork 148 and actuator 150. If engagement of gear 108 to mainshaft 28 is desired, gear 108 will be moved axially leftwardly to the position illustrated in FIG. 9B the preselect position.

In the preselect position, the blocking action of array members 107, 172 and 174, with blocker 124 in its blocking rotational position relative to clutch member 116, will maintain clutch teeth 162 of the clutch member 116 axially separated from clutch teeth 164 in gear 108. As the blocker 124, which tends to rotate with gear 108, is rotated relative to clutch 116 to bring the arrays into alignment by causing gear 108 and shaft 28 to cross through synchroneous, the jaw clutch will become unblocked and, under the bias of compressed spring 130, fire into engagement with gear 108 as illustrated in FIG. 9C.

In the preselect position, as illustrated in FIG. 9B, it is important that the blocker 124 remain clocked in the blocking position relative to jaw clutch 116 and only rotate relative to clutch 116 to the aligned unblocked position as a result of the gear and clutch passing through synchronous. Under conditions of low mainshift inertia, i.e. mainsection 12 not engaged, the friction surfaces 188 and 190 will first cause the shaft 28 to rotate substantially synchronously with gear 108, and then the sensor unblocking ramps 176, 178, 180 and 182 will cause the blocker 124 to rotate relative to the clutch 116 to a nonblocking position. The positioning function of the ramps is necessary as a crossing through synchronous, not merely achieving synchronous, is necessary to clock the blocker from a blocking to a non-blocking position.

To assure that the action of the sensor unblocking ramps does not improperly act on the sensor, the sensor must be subject to blocking torque, i.e. the sensor 124 and second jaw clutch member (108 and 164) must be properly frictional engaged, at the blocking torque cones friction surfaces 188 and 190, to assure the blocker is frictionally urged to tend to rotate with the second jaw clutch member. If this frictional contact is not properly established and maintained, the sensor unblocking ramps may improperly cause the sensor 124 to rotate to an unblocked position relative to clutch member 116.

Figure 10:
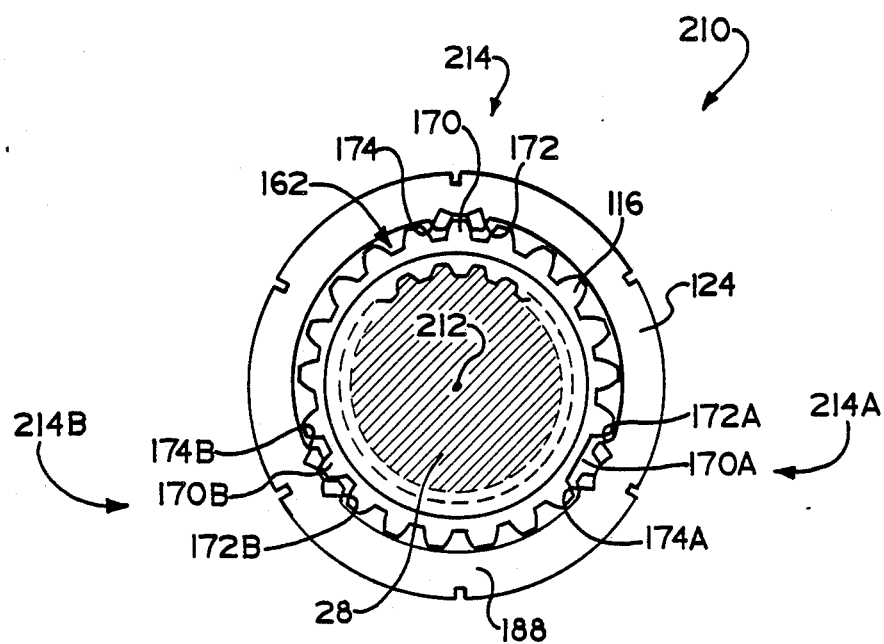
FIG. 10 is a sectional view of one embodiment of the blocked jaw clutch assembly of the present invention.

Referring to FIG. 10, a blocked jaw clutch assembly 210 of the type utilizing sensor unblocking ramps is illustrated. Jaw clutch assembly 210, except for a structural modification described below, is substantially structurally and functionally identical to the blocked jaw clutch assembly 156. Elements of assembly 210, and of the other alternate embodiments described herein having the same or substantially the same structure and function as elements of assembly 156 described above will be assigned like reference numerals. Assembly 210 includes a blocker or sensor ring 124 from which a plurality of sets or pairs of blocking teeth or projections extend radially inwardly. The three sets, 172 and 174, 172A and 174A, and 172B and 174B of ramped blocking teeth are spaced substantially circumferentially equally about the rotational axis 212 of blocker ring 124. An equal number of partially removed blocking teeth 170, 170A and 170B would, in the prior art, extend radially outwardly from jaw clutch member 116 for blocking interaction with the blocking teeth carried by the blocker 124 to define three substantially equally circumferentially spaced arrays of blocking projections, 214, 214A and 214B.

It has been discovered that the prior art blocked jaw clutch assemblies having sensor unblocking ramps thereon have a tendency, under certain unfavorable conditions, to improperly become unblocked. It has also been found, under experimentation, that this tendency can be minimized and/or eliminated by modifying the prior art structure to the structure 210 illustrated in FIG. 10 such that, upon initial contact of the arrays, the blocker 124 is caused to tilt and/or radially shift relative to friction cone 190 carried by gear 108, or at least non-symmetrical frictional contact between the friction cones 188 and 190 of the blocker member 124 and gear 108, respectively, is caused. Such tilting and/or radial shifting of the blocker and/or non-symmetrical frictional engagement between the cone surfaces is believed to minimize or eliminate undesirable unblocking because the non-symmetrical contact of the blocking torque friction surfaces and/or relative tilting of the members results in an initial breakdown of the oil film between the blocking torque friction surfaces and thus allows an early establishment of blocking torque on the blocker 124. Also, a relatively small friction force in the radial direction between the members may act in opposition to any premature unblocking force generated by the unblocking ramps. In any event, it is believed that the present invention provides the observed advantages by assuring that the blocking torque caused by the frictional engagement of the cone friction surfaces 188 and 190, which cause the blocker to tend to rotate with the first clutch member 164, is established and maintained at all times that the sensor unblocking ramps are in axial contact.

The advantages of the present invention may be achieved by a multitude of structural modifications, several of which are illustrated in the Figures and discussed below by way of example only.

Referring to FIG. 10, it may be seen, as illustrated in the dotted lines, that by removal of the normally present blocking tooth 170A extending from the clutch member 116 and/or removal of the blocker teeth or projection pair 172A and 174A extending from the blocker 124, a blocked jaw clutch assembly will be provided wherein, upon contact of the remaining arrays, namely 214 and 214B, the resulting forces will tend to create a tilting action on blocker 124 and the friction cone surface 188 carried thereby as well as a non-symmetrical frictional contact between the cone friction surfaces 188 and 190. Of course, any arrangement of arrays that results in a circumferentially nonsymmetrical engagement of said arrays about the rotational axis 212 will have a similar advantageous effect.

Figure 11:
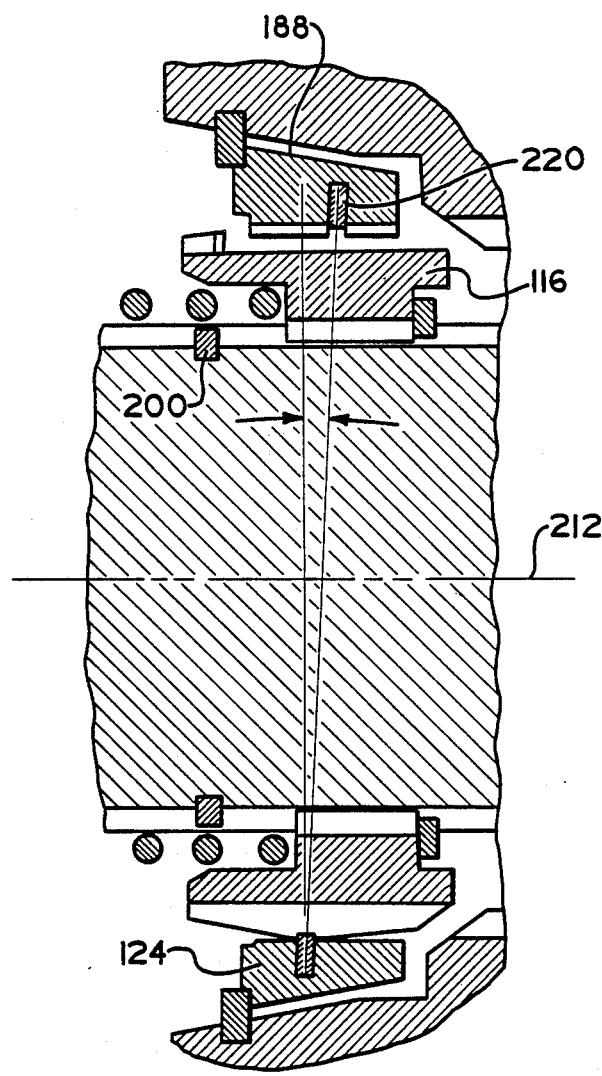
FIG. 11 is a fragmentary sectional view of an alternate embodiment of the present invention.

FIG. 11 illustrates an alternate embodiment of the present invention wherein the groove 220 in which the preenergizing ring 186 is received is inclined rather than normal to the rotational axis 212 and thus the preenergizer ring 186 will tend to apply a tilt to sensor 124 and friction surface 188 carried thereby relative to the rotational axis 212 and cone friction surface 190 of gear 108.

Figure 12:
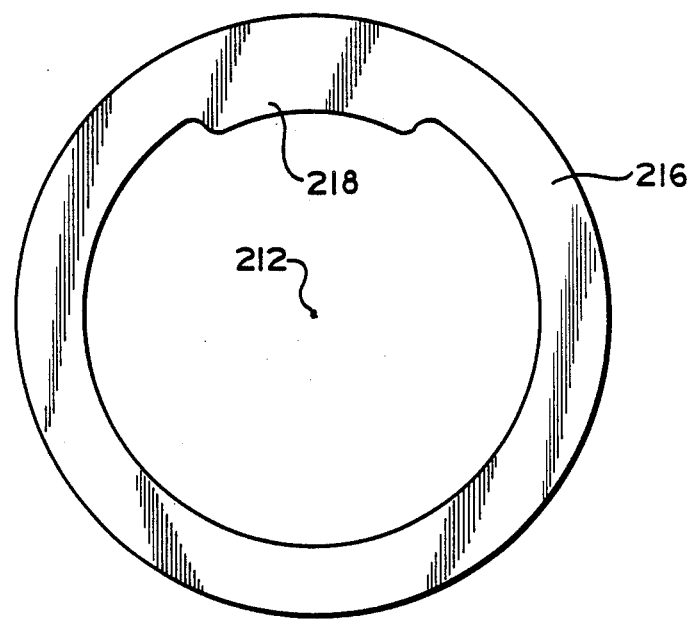
FIG. 12 is a plan view of a preenergizing ring for another alternate embodiment of the present invention.

Referring to FIG. 12, a modified pre-energizing ring 216 having a non-symmetrical radially inwardly extending portion 218 is illustrated. Briefly, pre-energizing ring 216 will be received in pre-energizer groove 184 in sensor 124 in place of prior art pre-energizing ring 186. The action of the nonsymmetrical radially inwardly extending portion 218 on the outer radial periphery of the teeth 162 of jaw clutch member 116 will cause the blocker 124 to be tilted relative to the axis of gear 108 and cone friction surface 190 carried thereby and/or will result in a nonsymmetrical circumferential engagement force between the cone friction surfaces 188 and 190.

Figures 13, 14:
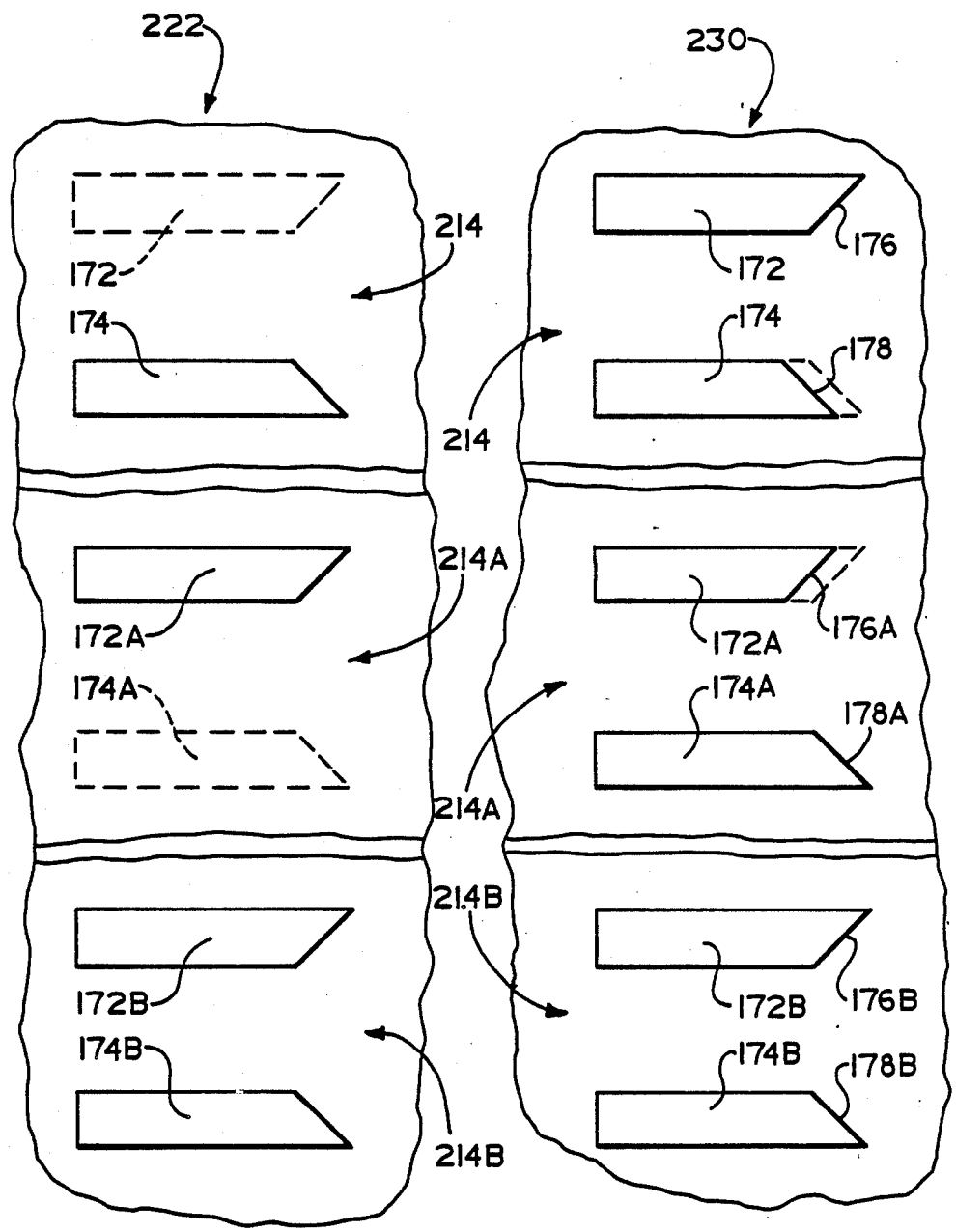
FIG. 13 is a schematic illustration of a blocker utilized in another alternate embodiment of the present invention.
FIG. 14 is a schematic illustration of a blocker utilized in a further alternate embodiment of the present invention.

In FIG. 13 an alternate embodiment of the present invention utilizing a modified sensor ring 222 is illustrated. As may be seen, tooth 172, the downshift sensing tooth of array 214 is removed as is tooth 174A, the upshift sensing tooth of array 214A. Accordingly, during a downshift the arrays 214A and 214B will be effective while during an upshift arrays 214 and 214B will be effective. This provides the advantage of more evenly distributing any operating wear than would be the case if one of the arrays 214, 214A or 214B, were eliminated for both the upshift and downshift sensing directions of relative rotation.

In FIG. 14, an alternate embodiment similar to that illustrated in FIG. 13 is illustrated utilizing a modified blocker 230. In blocker 230, the leading ramped surface 178 of upshift sensing blocker tooth or projection 174 of array 214 is cut back i.e. extends less axially rightwardly than do teeth 174A and 174B while the leading ramp surface 176A of upshift sensing blocker tooth 172A of array 214A is cut back. The ramp surfaces 176B and 178B, of blocking teeth 172B and 174B, respectively, of array 214B are not modified. Preferably, the cut back ramp surfaces are cut back by about ten thousandths (10/1000) of an inch thereby assuring a tilting of the blocker member 230 and/or non-symetric circumferential engagement between the cone clutch surfaces at initial engagement of the arrays.

As may be seen from the above, improved blocked jaw clutch assemblies with sensor unblocking ramps according to the present invention may be provided by a multitude of structural modification to the existing prior art devices as described and claimed in above mentioned U.S. Pat. Nos. 3,983,797 and 3,924,484. Accordingly, by relatively simple modification of the prior art devices, improved blocked jaw clutch assemblies having sensor unblocking ramps, and blocked or semiblocked transmissions utilizing same, are provided.

Although this invention has been described in its preferred form with a certain degree of particularity, it is understood that present disclosure of the preferred form is for descriptive purposes only and that various modifications and changes in the detailed construction and arrangement of the parts may be resorted to without departing from the spirit and the scope of the invention as claimed.

I claim:

1. A blocked resilient jaw clutch assembly for coupling a gear to a shaft, said blocked resilient jaw clutch assembly comprising a first jaw clutch member fixed to said gear and definig a first set of clutch teeth and a second jaw clutch member rotationally fixed but axially slidable relative to said shaft and defining a second set of clutch teeth for engagement with said first set of clutch teeth, said second jaw clutch member resiliently biased towards said first jaw clutch member, a stop means fixedly secured to said shaft, spring means normally resiliently urging said second jaw clutch member against said stop means when said gear is in a first axial position and said first and second sets of clutch teeth are disengaged, a substantially nondeformable blocker ring carried by said second jaw clutch member for rotation there with a predetermined limited relative rotation therebetween, said blocker ring axially movable relative to said second jaw clutch member in at least one axial direction, friction means comprising friction surfaces carried by said blocker ring and said first clutch member, said friction surfaces adapted to be axially engaged at initiation of a clutch engagement operation whereby said blocker ring is operable to tend to rotate with said first jaw clutch member at initiation of a clutch engaging operation, said blocker ring and second jaw clutch member each having projections extending therefrom defining a plurality of arrays of interacting projections, said arrays of interacting projections effective to block relative axial movement of said second jaw clutch member toward said first jaw clutch member if not aligned, said blocker ring having at least one rotational position relative to said second jaw clutch member wherein said arrays of projections are aligned and at least one rotational position relative to said second jaw clutch member wherein said arrays of projections are not aligned, said blocker ring effective to sense non-synchronous rotation of said clutch members corresponding to blocker ring rotation relative to said second jaw clutch member sufficient to cause a non-alignment of said arrays to projections to block axial engagement of said clutch members, movement of said gear axially toward said second jaw clutch member causing said arrays to contact and move said second jaw clutch member axially away from said stop means in opposition to said spring means whereby said spring means will cause said second jaw clutch member to again move axially in the opposite direction to meshingly engage said first set of teeth when substantial speed synchronization is achieved therebetween, said arrays having complementary ramps thereon which, under the bias urging said arrays into axial contact, will tend to cause said arrays to align, said assembly characterized by:

said plurality of arrays unequally circumferentially spaced relative to the axis of rotation of said first clutch member for providing an axial force circumferentially asymetrical relative to the axis of rotation of said first clutch member urging said friction surfaces into contact at the initiation of engagement of said clutch assembly.

2. The assembly of claim 1 wherein said ramps define an angle of 15°–25° with respect to a plane normal to the axis of said shaft.

3. The assembly of claim 1 wherein said asymetrical axial force causes said blocker ring to tilt relative to the axis of rotation of said first clutch member at initial engagement of said friction surfaces.

4. The assembly of claim 1 wherein said asymetrical force urges the axis of rotation of said blocker ring to move radially relative to the axis of rotation of said first clutch member at initial engagement of said friction surfaces.

5. A blocked resilient jaw clutch assembly for coupling a gear to a shaft, said blocked resilient jaw clutch assembly comprising a first jaw clutch member fixed to said gear and defining a first set of clutch teeth and a second jaw clutch member rotationally fixed but axially slidable relative to said shaft and defining a second set of clutch teeth for engagement with said first set of clutch teeth, said second jaw clutch member resiliently biased towards said first jaw clutch member, a stop means fixedly secured to said shaft, spring means normally resiliently urging said second jaw clutch member against said stop means when said gear is in a first axial position and said first and second sets of clutch teeth are disengaged, a substantially nondeformable blocker ring carried by said second jaw clutch member for rotation therewith with a predetermined limited relative rotation therebetween said blocker ring axially movable relative to said second jaw clutch member in at least one axial direction, friction means comprising friction surfaces carried by said blocker ring and said first clutch member, said friction surfaces adapted to be axially engaged at initiation of a clutch engagement operation whereby said blocker ring is operable to tend to rotate with said first jaw clutch member at initiation of a clutch engaging operation, said blocker ring and second jaw clutch member each having projections extending therefrom defining a plurality of arrays of interacting projections, said arrays of interacting projections effective to block relative axial movement of said second jaw clutch member toward said first jaw clutch member if not aligned, said blocker ring having at least one rotational position relative to said second jaw clutch member wherein said arrays of projections are aligned and at least one rotational position relative to said second jaw clutch member wherein said arrays of projections are not aligned, said blocker ring effective to sense non-synchronous rotation of said clutch members corresponding to blocker ring rotation relative to said second jaw clutch member sufficient to cause a non-alignment of said arrays of projections to block axial engagement of said clutch members, movement of said gear axially toward said second jaw clutch member causing said arrays to contact and move said second jaw clutch memer axially away from said stop means in opposition to said spring means whereby said spring means will cause said second jaw clutch member to again move axially in the opposite direction to meshingly engage said first set of teeth when substantial speed synchronization is achieved therebetween, said arrays having complementary ramps thereon which, under the bias urging said arrays into axial contact, will tend to cause said arrays to align, said assembly characterized by:

each of said arrays comprising a pair of spaced first blocker projections extending from one of said blocker ring and said second clutch member and a second blocker projections extending from the other of said blocking ring and said second clutch member, each pair of first blocker projections comprising an overspeed projection which will engage said second blocker projection when said blocker is caused to tend to rotate with said first jaw clutch member and said first jaw clutch member is rotating faster than said second jaw clutch member and an underspeed projection which will engage said second blocker projection when said blocker is caused to tend to rotate with said first jaw clutch member and said first jaw clutch member is rotating slower than said second jaw clutch member, said arrays configured such that the second blocker projection of one of said arrays will contact the associated overspeed first blocker projection while the second blocker projection of a different array is not in contact with an overspeed first projection and the second blocker projection of an array other than said one of said arrays will contact its associated underspeed first blocker projection while the second blocker projection of a different array is not in contact with an underspeed first blocker projection for providing an axial force circumferentially asymetrical relative to the axis of rotation of said first clutch member urging said friction surfaces into contact at the initiation of engagement of said clutch assembly.

6. The assembly of claim 5 wherein said ramps define an angle of 15°–25° with respect to a plane normal to the axis of said mainshaft.

7. The assembly of claim 5 wherein said plurality of arrays are substantially equally circumferentially spaced about the rotational axis of said second jaw clutch member and said blocker ring.

8. A blocked resilient jaw clutch assembly for coupling a gear to a shaft, said blocked resilient jaw clutch assembly comprising a first jaw clutch member fixed to said gear and defining a first set of clutch teeth and a second jaw clutch member rotationally fixed but axially slidable relative to said shaft and defining a second set of clutch teeth for engagement with said first set of clutch teeth, said second jaw clutch member resiliently biased towards said first jaw clutch member, a stop means fixedly secured to said shaft, spring means normally resiliently urging said second jaw clutch member against said stop means when said gear is in a first axial position and said first and second sets of clutch teeth are disengaged, a substantially nondeformable blocker ring carried by said second jaw clutch member for rotation therewith with a predetermined limited relative rotation therebetween, said blocker ring axially movable relative to said second jaw clutch member in at least one axial direction, friction means comprising friction surfaces carried by said blocker ring and said first clutch member, said friction surfaces adpated to be axially engaged at initiation of a clutch engagement operation whereby said blocker ring is operable to tend to rotate with said first jaw clutch member at initiation of a clutch engaging operation, said blocker ring and second jaw clutch member each having projections extending therefrom defining a plurality of arrays of interacting projections, said arrays of interacting projections effective to block relative axial movement of said second jaw clutch member toward said first jaw clutch member if not aligned, said blocker ring having at least one rotational position relative to said second jaw clutch member wherein said arrays of projections are aligned and at least one rotational position relative to said second jaw clutch member wherein said arrays of projections are not aligned, said blocker ring effective to sense non-synchronous rotation of said clutch members corresponding to blocker ring rotation relative to said second jaw clutch member sufficient to cause a non-alignment of said arrays of projections to block axdial engagement of said clutch members, movement of said gear axially toward said second jaw clutch member causing said arrays to contact and move said second jaw clutch member axially away from said stop means in opposition to said spring means whereby said spring means will cause said second jaw clutch member to again move axially in the opposite direction to meshingly engage said first set of teeth when substantial speed synchronization is achieved therebetween, said arrays having complementary ramps thereon which, under the bias urging said arrays into axial contact, will tend to cause said arrays to align, said assembly characterized by:

said blocker ring surrounding the outer periphery of said second clutch member and including a second friction means for creating an axial frictional drag between said blocker ring and said second jaw clutch member, said second friction means including an internal groove within said blocker ring and a friction ring contained within said groove and bearing against a portion of the teeth of said second jaw clutch element in a circumferentially non-symetrical manner, said groove being non-perpendicular to the axis of rotation of said blocker ring.

9. A blocked resilient jaw clutch assembly for coupling a gear to a shaft, said blocked resilient jaw clutch assembly comprising a first jaw clutch member fixed to said gears and defining a first set of clutch teeth and a second jaw clutch member rotationally fixed but axially slidable relative to said shaft and defining a second set of clutch teeth for engagement with said first set of clutch teeth, said second jaw clutch member resiliently biased towards said first jaw clutch member, a stop means fixedly secured to said shaft, spring means normally resiliently urging said second jaw clutch member against said stop means when said gear is in a first axial position and said first and second sets of clutch teeth are disengaged, a substantially nondeformable blocker ring carrier by said second jaw clutch member for rotation therewith with a predetermined limited relative rotation therebetween, said blocker ring axially movable relative to said second jaw clutch member in at least one axial direction, friction means comprising friction surfaces carried by said blocker ring and said first clutch member, said friction surfaces adapted to be axially engaged at initiation of a clutch engagement operation whereby said blocker ring is operable to tend to rotate with said first jaw clutch member at initiation of a clutch engaging operation, said blocker ring and second jaw clutch member each having projections extending therefrom defining a plurality of arrays of interacting projections, said arrays of interacting projections effective to block relative axial movement of said second jaw clutch member toward said first jaw clutch member if not aligned, said blocker ring having at least one rotational position relative to said second jaw clutch member wherein said arrays of projections are aligned and at least one rotational position relative to said second jaw clutch member wherein said arrays of projections are not aligned, said blocker ring effective to sense non-synchronous rotation of said clutch members corresponding to blocker ring rotation relative to said second jaw clutch member sufficient to cause a non-alignment of said arrays of projections to block axial engagement of said clutch members, movement of said gear axially toward said second jaw clutch member causing said arrays to contact and move said second jaw clutch member axially away from said stop means in opposition to said spring means whereby said spring means will cause said second jaw clutch member to again move axially in the opposite direction to meshingly engage said first set of teeth when substantial speed synchronization is achieved therebetween, said arrays having complementary ramps thereon which, under the bias urging said arrays into axial contact, will tend to cause said arrays to align, said assembly characterized by:

said blocker ring surrounding the outer periphery of said second clutch member and including a second friction means for creating an axial frictional drag between said blocker ring and said second jaw clutch member, said second friction means including an internal groove within said blocker ring and a friction ring contained within said groove and bearing against a portion of the teeth of said second jaw clutch element in a circumferentially non-symetrical manner, said friction ring defining a first and second radially inwardly extending surface, the second inwardly extending surface being of greater inward extension than the first inwardly extending surface.

* * * * *